United States Patent
Skaletzky

(10) Patent No.: US 7,109,995 B2
(45) Date of Patent: Sep. 19, 2006

(54) CASCADE OF VIDEO PROCESSING ENTITIES AND A METHOD FOR PROCESSING VIDEO

(75) Inventor: Gil Skaletzky, Karkur (IL)

(73) Assignee: Zoran Corporation, Sunnyvale, CA (US)

( * ) Notice: Subject to any disclaimer, the term of this patent is extended or adjusted under 35 U.S.C. 154(b) by 231 days.

(21) Appl. No.: 10/692,964

(22) Filed: Oct. 23, 2003

(65) Prior Publication Data

US 2005/0099424 A1    May 12, 2005

(51) Int. Cl.
G06T 1/20 (2006.01)
G06T 1/00 (2006.01)
G06F 15/16 (2006.01)

(52) U.S. Cl. .................. 345/506; 345/502; 345/501

(58) Field of Classification Search ........ 345/501–506, 345/530, 563, 418, 581, 589, 600, 603, 604, 345/556, 520, 617, 611, 522; 713/300, 320
See application file for complete search history.

(56) References Cited

U.S. PATENT DOCUMENTS

| | | | |
|---|---|---|---|
| 4,914,574 A * | 4/1990 | Terada et al. ................... 710/1 |
| 5,296,935 A | 3/1994 | Bresler | |
| 5,737,032 A * | 4/1998 | Stenzel et al. .............. 348/649 |
| 5,886,912 A * | 3/1999 | Miyake et al. .............. 708/300 |
| 5,991,883 A * | 11/1999 | Atkinson ...................... 713/300 |
| 6,020,931 A | 2/2000 | Bilbrey et al. | |
| 6,236,413 B1 * | 5/2001 | Gossett et al. .............. 345/506 |
| 6,377,628 B1 | 4/2002 | Schultz et al. | |
| 6,628,290 B1 * | 9/2003 | Kirk et al. ................... 345/506 |
| 6,778,177 B1 * | 8/2004 | Furtner ......................... 345/544 |

FOREIGN PATENT DOCUMENTS

EP    0 713 291 A2    5/1996

OTHER PUBLICATIONS

Patent Corporation Treaty, Search Report, From the International Searching Authority, International Application No. PCT/US2004/035048, Applicant Zoran Corporation, International Filing Date: Oct. 21, 2004.

* cited by examiner

Primary Examiner—Ulka Chauhan
Assistant Examiner—Joni Hsu
(74) Attorney, Agent, or Firm—Blakely, Sokoloff, Taylor & Zafman LLP

(57) ABSTRACT

Processing video by receiving input video data and associated control signals; determining, in response to the control signals, whether to process the input video data or to bypass the input video data so as to provide output video data; processing the input video data, or bypassing the input video data, in response to the determination; and allowing a next cascaded entity to receive the output video data and the control signals. A cascade of at least two video processing entities, each including: an input interface for receiving input video data and associated control signals; logic for receiving at least one control signal and in response to select a selected path out of at least one processing path and at least one bypass path; wherein the selected path outputs output video data; and an output interface for allowing a next cascaded entity to receive at least the output video data.

47 Claims, 8 Drawing Sheets

CASCADE OF VIDEO PROCESSING ENTITIES AND A METHOD FOR PROCESSING VIDEO

FIELD OF THE INVENTION

The invention relates to video processing techniques and to video processing entities that are arranged in a manner that simplifies the design of video processors.

BACKGROUND

Integrated Circuits and Timing Validation

During the last few years the complexity of integrated circuits (ICs) has increased dramatically. On the other hand, the increasingly competitive market forced IC designers to reduce the cost and length of the IC design process.

One of the methods for reducing the cost of the IC design process, as well as speed-up the design process, involves re-using IC blocks (such as host processors, mixed signal blocks, dedicated logic and memory blocks) as well as increasing the integration level between IC blocks and sub-blocks. Integrated circuits such as system-on-chip provide a high degree of integration.

In many IC based systems and multi-IC based systems there is a need to coordinate between many blocks, as well as to control the transmission of signals over commonly shared buses. Typically, a controller controls the transmission of signals by applying a Media Access Control (MAC) protocol.

In addition to the increasing complexity of ICs, the clock rates of the ICs have dramatically increased. IC clock rates that exceed tens of megahertz and even gigahertz are very common.

Due to the increasing clock rates timing issues are becoming more crucial. For example, when a controller has to apply a MAC protocol it has to take into account the delays associated with a propagation of signals over the bus to each unit that shares the common bus.

These timing constraints may result in degradation in the IC performances. They may also complicate the validation process, and especially the timing validation process of the IC based system. Some of the problems that are associated with timing validation process are highlighted in the following article: "Breaking down complexity for reliable system-level timing validation", by D. Ziegenbein, M. Jersak, K. Richter and R. Ernst of the Technical University of Braunschweig, Germany.

Due to various reasons, including timing issues, changes in the arrangement of blocks, an/or in the number of blocks as well as in the content of blocks may require an extensive design and validation process.

Video Processing

Pixel is the smallest addressable element of an electronic display. Each pixel has a color that is commonly represented by three color components. The most commonly used representations (also known as color spaces) are RGB (Red, Green Blue color components) and $YC_bC_r$ (Y holds the luminance information while $C_b$ and $C_r$ hold color difference data).

Computer systems apply various video processing processes in order to display a required visual content on an electronic display. The required visual content (image) may include multiple pictures (including picture in picture), text, graphics and the like. The video processing processes may include alpha blending, color format conversion, gamma correction and the like.

In a typical scenario multiple units cooperate in order to provide the required visual content. These units are controlled by a controller that sends control signals to the various units.

In the typical scenario a unit may receive signals (including video data and control signals) from multiple units. Accordingly, the validation process of the unit has to take into account the interactions between these units and the associated timing issues.

U.S. Pat. No. 6,329,996 of Bowen et al describes the difficulties in coordinating multiple graphic pipelines (each capable of performing the whole processing process) and offers a method and apparatus for synchronizing between graphic pipelines.

The video processing processes that are required to provide the required visual content may vary over time and may also differ from product to another.

There is a need to simplify the design process, as well as reduce the cost of the design process of IC that perform video processing processes.

SUMAMRY OF THE INVENTION

The invention provides a method and a computer readable medium having code embodied therein for causing an electronic device to perform the following steps: (i) receiving, by a current video processing entity, input video data and associated control signals; (ii) determining, by the current video processing entity, in response to at least one associated control signal, whether to process the input video data or to bypass the input video data such as to provide output video data; (iii) processing the input video data, by the current video processing entity, or bypassing the input video data, in response to the determination; and (iv) allowing a next cascaded entity to receive the output video data and the control signals.

The invention provides a method and a computer readable medium having code embodied therein for causing an electronic device to perform the following steps: (i) receiving, by a video processing entity of a cascade, input video data and associated control signals; (ii) providing the input video data to a selected path out of at least one bypass path and at least one video processing path, whereas the selection is responsive to at least one associated control signal; (iii) outputting output video data from the selected path and outputting associated control signals; and (iv) repeating the steps of receiving, providing and outputting until a predefined entity receives the output video data.

The invention provides a cascade of at least two video processing entities, whereas each video processing entity includes: (i) an input interface for receiving input video data and associated control signals; (ii) logic, connected to the input interface, for receiving at least one associated control signal and in response to select a selected path out of at least one processing path and at least one bypass path; whereas the selected path outputs output video data; and (iii) an output interface, coupled to the at least one processing path and to the at least one bypass path, for allowing a next cascaded entity to receive at least the output video data.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION

Figure 1:
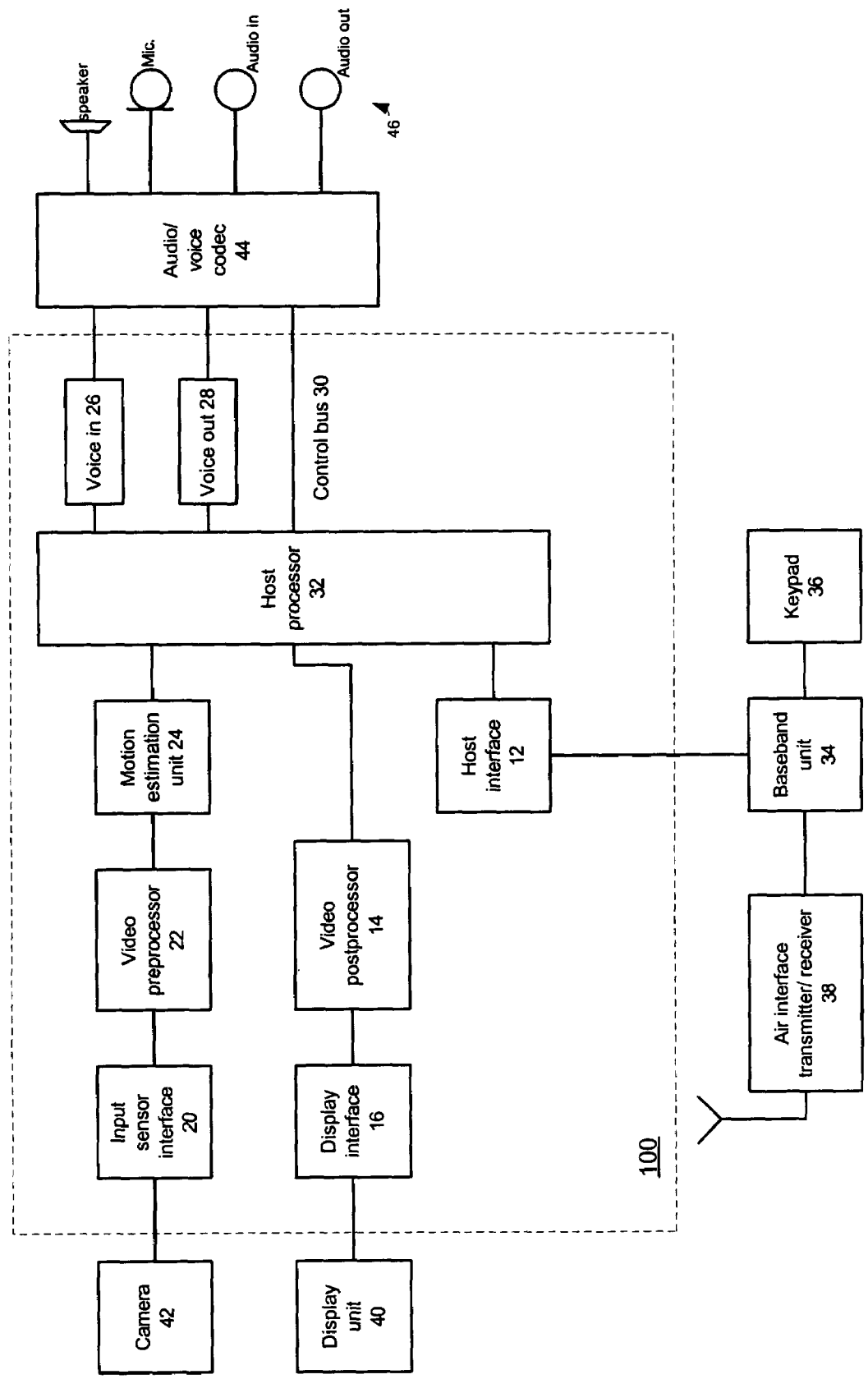
FIG. 1 is a schematic illustration of a mobile multimedia system-on-chip and its environment, in accordance with an embodiment of the invention.

FIG. 1 is a schematic illustration of a mobile multimedia system-on-chip 100 and its environment.

It can be a part of cellular phones, communicators and Personal Data Accessories.

System on-chip 100 includes a host interface 12, a video postprocessor 14, a display interface 16, an input sensor interface 20, a video preprocessor 22, a motion estimation unit 24, voice in interface 26, voice out interface 28 and control bus 30, as well a host processor 32. The host processor 32 has various capabilities such as video encoding and decoding capabilities and audio encoding and decoding capabilities.

The host processor 32, video postprocessor 14 and display interface 16 are serially connected to each other such as to form a first path that drives a display unit 40 connected to the display interface 16. The display interface 16 can send display data either to a termination unit such as display unit 40 or a memory unit (not shown).

The input sensor interface 20, video preprocessor 22, motion estimation unit 24 and the host processor 32 are serially connected to each other such as to form a second path that exchanges signals with a camera 42 that is connected to input sensor interface 20.

Host processor 32 is connected to an audio/voice codec 44 via voice in interface 26, voice out interface 28 and control bus 30. The audio/voice codec 44 is connected to a speaker, microphone and to audio input and output port, collectively denoted 46.

The host interface 12 is connected between host processor 32 and a baseband unit 34 that in turn is connected between keypad 36 and air interface transmitter/receiver unit 38.

The host processor 32 is adapted to provide video data of various types to the video postprocessor 14 that in turn applies multiple video processing processes to drive display unit 40 or to provide display data to a memory unit (not shown). The video processing processes may include: rotation; resizing (up-scaling and down-scaling); picture brightness, contrast and saturation control operations; color format conversion; alpha blending; LCD display gamma adjustment and color space reduction (by error diffusion). The display interface 16 further performs LED display timing adjustment.

The different video processing processes are executed by video processing entities (VPEs). Each VPE is a block that can be used in future designs. The manner in which the VPE are connected and the manner in which they exchange signals allows to alter the design of the system in a simple manner. It also allows simple validation of each VPE, as well as easy timing validation.

Each VPE receives associated control signals from the previous VPE (or in the case of the first VPE—from pre-processing entity 90). Each VPE also receives input video data from the previous VPE. Some VPEs are able to retrieve additional data from other entities, but each VPE has a standard input and output interface for receiving input video data and associated control signals from a previous VPE unit.

Figure 2:
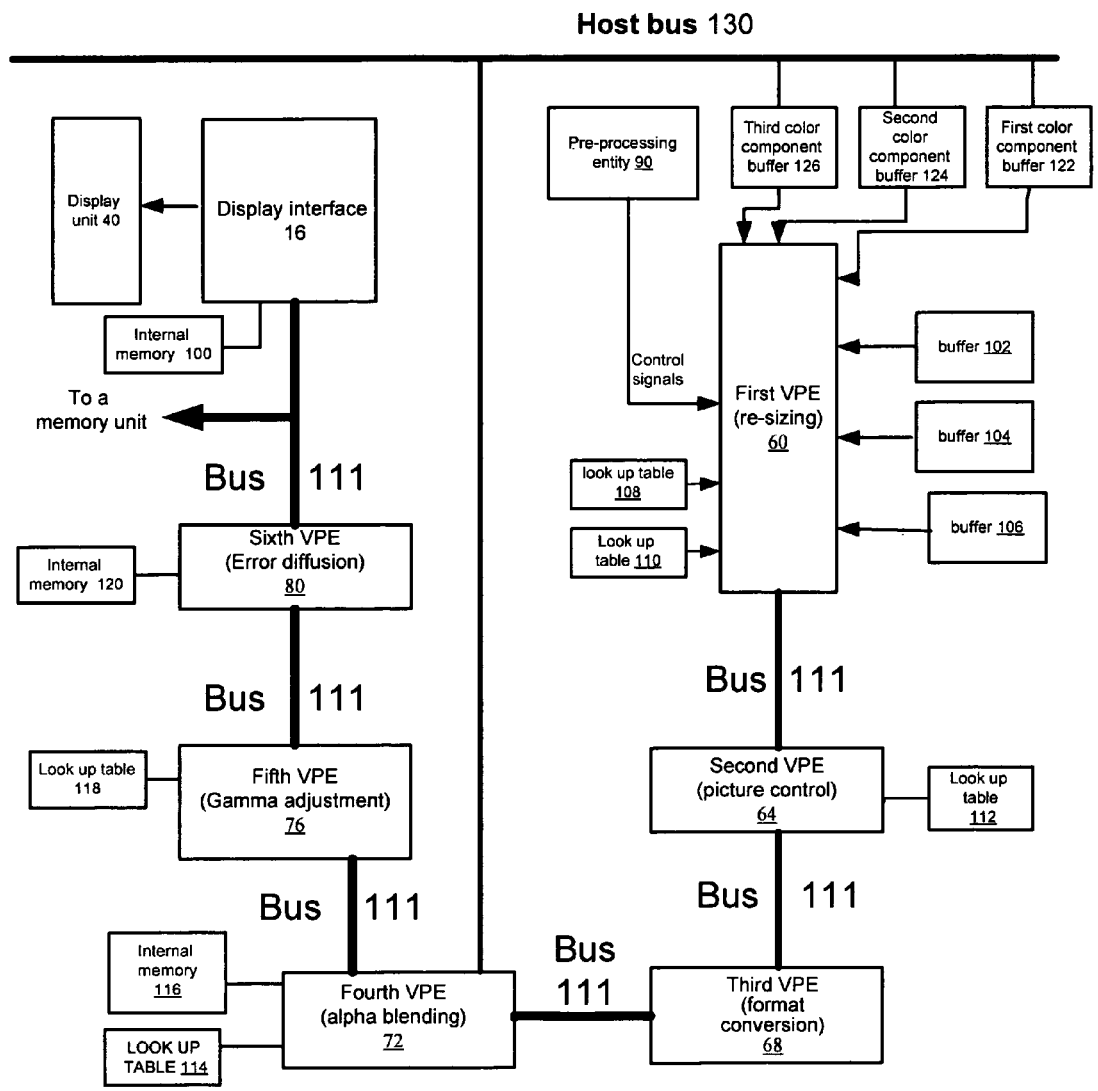
FIG. 2 illustrates an exemplary post processing unit and a display interface, in accordance with an embodiment of the invention.

An exemplary video postprocessor 14 and a display interface 16 are illustrated in FIG. 2. The video postprocessor 14 includes a cascade of VPEs 60–80, pre-processing entity 90, internal memory/buffers and look up tables 100–120.

A pre-processing entity 90 is connected to first VPE 60 and is adapted to generate control signals. The control signals are associated with video data such as pixels or pixel color components. The control signals indicate to each VPE whether it receives valid data (whether valid video data and associated control signals are provided to the inputs of the VPE), whether the VPE should process the video data and how to process. If a VPE does not process video data it allows the video data and associated control signals to propagate via an internal bypass path to the next cascaded VPE.

The VPEs are arranged such as to form a cascade. Each VPE is connected to a preceding VPE and to a succeeding VPE by bus 111 that over which the video data and associated control data propagate. It is assumed that bus 111 is thirteen bit wide, whereas eight bits are allocated for transferring video data and five bits are allocated for propagating associated control signals. Assuming that each color component is eight bit wide then three clock cycles are requires for receiving (or transmitting) a single pixel. It is noted that bus 111 can be wider or narrower, and each pixel can be represented by more or less bits, thus either accelerating or slowing the data transmission between VPEs.

The five associated control signals include a valid bit 150, two color component bits 152 and two pixel type bits 154. The two pixel type bits 154 indicate what is the video data type (for example see Table 3), and the two color component bits 152 indicate which color component is transmitted.

The video postprocessor 16 usually receives video data of various types. There types can be defined by their origin (for example: graphics or picture) or by the processes that they might undergo (for example background data is less affected by the cascade of VPEs). Picture type video usually originates from a camera and may include "natural images".

The video postprocessor 16 can also process pixels of mixed type (such as combined background and graphics, combined picture and graphics). A mixed type pixel is a pixel that is located at an overlap region between graphics, background, picture and the like.

Usually, graphics are in RGB color format while pictures (such as media stream pictures or still pictures) are in $C_b C_r Y$ color format, but this is not necessarily so.

The following tables illustrates exemplary control bits:

TABLE 1

| Signal name | Signal width (bits) | Description |
| --- | --- | --- |
| Valid bit | 1 | Indicates whether a VPE (or the pre-processing entity) is ready to output valid video data (in the case of VPE) and control signals |
| Color component bits | 2 | Indicates what is the color component in a given color format. |
| Pixel type bits | 2 | Indicates what is the pixel type. |

TABLE 2

| Color component bits | In RGB color space (graphics) | In $C_b C_r Y$ color space (picture) |
| --- | --- | --- |
| 00 | B | $C_b$ |
| 01 | R | $C_r$ |
| 10 | G | Y |

TABLE 3

| Pixel type bits | |
| --- | --- |
| 00 | Background pixel only. |
| 01 | Combined background and graphics pixel |
| 10 | Picture pixel |
| 11 | Combined picture and graphics pixel |

The pre-processing entity 90 asserts the valid bit 170 when it is ready to provide valid associated control signals to the first VPE. The valid bit 170 propagates through the cascade of VPEs until it reaches the display interface 16. Thus, each VPE can signal a next VPE of the cascade that the next VPE can strobe its inputs, as they receive valid video data and associated control signals from the preceding VPE. Pre-processing entity 90 can also negate the valid bit, and in such a case the VPE will sequentially freeze.

Each VPE can process at least one pixel type while bypassing the other pixel types. Each VPE receives a mask that is applied on one or more associated control bits to determine whether the VPE has to process or bypass the incoming video data. For example, second VPE 64 does not bypass any color component of a $C_b, C_r, Y$ format pixel but is may apply picture control operations only on the Y color component. The third VPE 68 performs space conversion operations for converting $C_b, C_r, Y$ to RGB, thus RGB pixels are bypassed. According to another embodiment of the invention each VPE can bypass or process a color components. In such a case the mask and/or VPE logic may be adjusted to allow bypassing one color component while bypassing another.

Typical masks include four bits and are applied to pixel type bits as well as to the valid bit. Table 4 illustrates the mask that is applied on the valid bit and the pixel type bits of Table 3:

TABLE 4

| Mask bits | |
| --- | --- |
| 0000 | Bypass all pixel types. |
| 0001 | Process background pixel. |
| 0010 | Process combined background/graphics pixel |
| 0100 | Process picture pixel. |

TABLE 4-continued

| Mask bits | |
| --- | --- |
| 1100 | Process combined picture/graphics pixel |
| 1111 | Process all pixel types. |

Referring back to FIG. 2, first VPE 60 receives control signals over a control bus from pre-processing entity 90 and also receives video data from three internal buffers 122–126 that are connected between the video data input lines of first VPE 60 and between host but 130. Each internal buffer receives a different color component.

First VPE 60 strobes his video input lines when the valid bit 170 is asserted and determines whether to process or bypass the video data in response to a comparison between his mask and the pixel type bits.

First VPE 60 is capable of re-sizing a picture. The picture can be a part of a video stream or can be a still picture. First VPE 60 may apply various extrapolation and decimation operators and may include a multi-tap extrapolation and/or decimation filter. It is connected to various look up tables 108–110 and to internal buffers 102–106 that provide additional information for performing re-sizing. The first VPE 60 is connected by bus 111 to second VPE 64.

The second VPE 64 performs picture control operations, such as brightness adjustment, saturation control operations and the like, on a pixel to pixel basis or even on a color component basis. Second VPE 64 is connected to look up table 112 that is updated by host processor 32. The look up table 112 is used to replace the value of color components such as to implement picture control operations. A user can define various parameters (such as the brightness of the display) that are translated by host processor 32 to values of the entries of the look up table 112. The second VPE 64 is connected by bus 111 to third VPE 68.

The third VPE 68 performs space conversion operations for converting $C_b, C_r, Y$ to RGB. The translation simplifies alpha blending as well as matches the video data format to a required display data format. The third VPE 68 is connected by bus 111 to fourth VPE 72.

The fourth VPE 72 performs alpha blending. It receives RGB graphics data from bus 134 as well as video data from third VPE 68. The alpha blending factor (which defines the amount of blending) is stored in internal memory 116. The fourth VPE 72 is also connected to look-up table 114 for performing color format conversions. The fourth VPE 72 is connected by bus 111 to fifth VPE 76.

The fifth VPE 76 performs gamma correction operations. Gamma correction operations compensate for the non-linear characteristics of displays, such as LED display unit 40. Information relating to the gamma correction (such as the relation between pixel level and display illumination) are stored in internal memory 118 that is connected to the fifth VPE 76. The fifth VPE 76 is connected by bus 111 to sixth VPE 80.

The sixth VPE 80 performs color space reduction (by applying error diffusion algorithm). This is required when the amount of bits allocated for representing a pixel is decremented to match the display unit 40 characteristics. For example, an RBG-24 format video data (in which each color component is 8-bit wide) that is either processed or bypassed by first till fifth VPEs 60–76 has to be reduced to a 18-RGB format or other color format (such as RGB 5:6:5, RGB 4:4:4 or even RGB 3:3:2) of the display unit 40. As the amount of bits is reduced there is a need to apply error diffusion algorithms in order to reduce color artifacts resulting from the bit reduction. Most error diffusion algorithms are responsive to multiple pixels, such as pixels of the last few lines. The sixth VPE 80 is connected to internal memory 120 that stores the last few lines. The sixth VPE 80 is connected by bus 111 to display interface 16.

Display interface 16 is capable of driving the display unit 40 in response to received video data from sixth VPE 80 and in response to timing constraints. The timing constraints include substantially matching the pixel clock that is used to drive video data and control signals over bus 111, with the display unit 40 data rate. The timing constraints may also include vertical synchronization signals as well as horizontal reference signals. It is noted that the video postprocessor 16 may send display data to the display unit 40 in various modes including an asynchronous mode, full synchronized more (in which the video postprocessor 16 controls both the vertical synchronization signals and the horizontal reference signals) or a partial synchronized mode in which it controls the vertical synchronization signals.

The display unit 40 has an internal memory (not shown) that receives the display data from the sixth VPE 80. The amount of valid display data within the internal memory (which is usually arranged as a FIFO buffer) is monitored. Once the level of valid display data exceeds a certain high threshold the monitoring process may provide a "full" indication to the pre-processing entity 90. In response, entity 90 negates the valid bit 170 and stops sending valid control signals to first VPE 60. The negation of the valid bit level propagates through all VPEs until the provision of display data to the interface unit 16 stops. Accordingly, the high threshold level is responsive to the overall latency of the cascade of VPEs. Once the level of data (within the display unit internal memory) reaches a certain low threshold an "empty" indication is sent to the pre-processing entity 90 that in turn asserts the valid bit 170 and starts to provide valid control signals to the first VPE 60 and to initiate the provision of valid video data to the first VPE 60. As the valid video data propagates through all the VPEs till reaching the display interface 16, the low threshold is also responsive to the overall latency of the VPEs. As the latency of the at least one processing path and bypass paths of each VPE is equal, the overall latency is constant.

Some of the VPEs may receive video data and/or other information (such as updated look up table entries, alpha value, and the like) from external units. If a VPE can determine that the required information has not arrived it can request the pre-processing entity 90 to negate the valid bit 170. Once the required information is ready the pre-processing entity 90 can be requested to assert the valid bit.

The pre-processing entity 90 may receive requests to negate the valid bit (and to assert it) from other components such as the host processor 32. In a typical scenario the host processor 32 may decide that the video postprocessor 16 does not have enough information and that the display unit 40 should not be refreshed with new display data until adequate information is provided to the video postprocessor 16.

Figure 3:
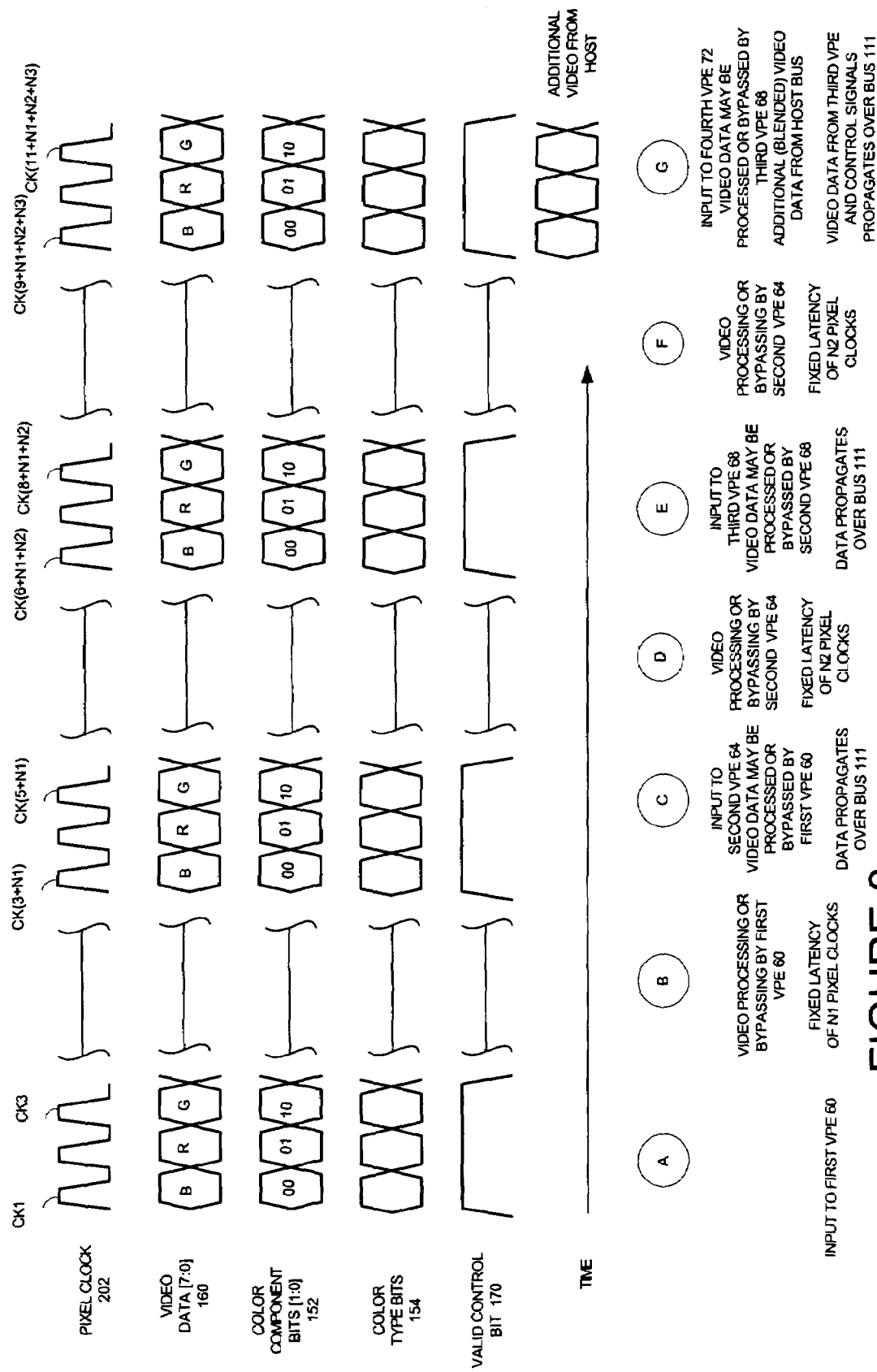
FIGS. 3–4 are exemplary timing diagrams of a transmission of video data and control signals between a pre-processing unit, multiple VPEs and a display interface, in accordance with an embodiment of the invention.
Figure 4:
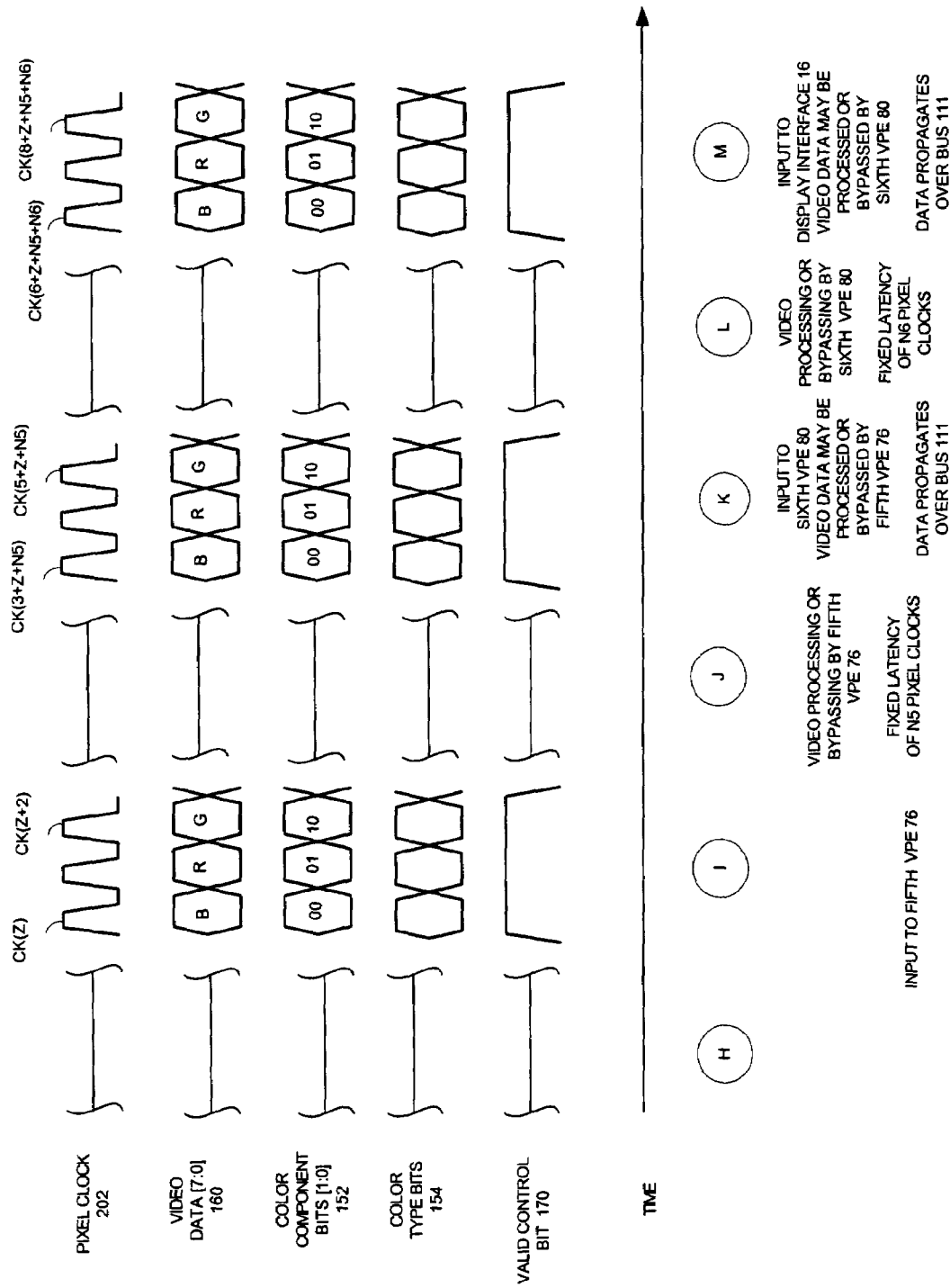

FIGS. 3–4 are exemplary timing diagrams of a transmission of video data and associated control signals, between pre-processing entity 90, VPEs 60–80 and the display interface 16. Most of the signals propagate over bus 111.

A video processing process starts by first event A in which the pre-processing entity 90 asserts valid bit 170 for three pixel clock cycles (CK–CK3) and provides additional control bits (such as color component bits 152 and color type bits 154) to first VPE 60. The color component bit values change during each of the three clock cycles to represent the transmission of B color component from buffer 122 (during CK1), the transmission of R color component from buffer 124 (during CK2) and the transmission of the G color component from buffer 126 (during CK3). It is noted that the pre-processing entity 90 may provide the video data signals to first VPE 60 by a bus such as bus 111.

Video data can be defined by an input video data when it is received by a VPE and as an output video data when it is transmitted from a VPE. In the cascaded arrangement of the VPEs the output video data of a certain VPE is the input video data of the following VPE.

After valid video data was received the video data is either processed by first VPE 60 or bypassed (the processing or bypassing are referred to as event B). The control signals are bypassed. In any case the latency of first VPE 60 is the same—N1 pixel clock cycles. Event B is followed by event C of transmitting video data and control signals over bus 111 to second VPE 64. The sequence of transmitting data over bus 111 (events E, G, I, K and M) and of processing or bypassing video data by VPEs (events D, F, H, J and L) are repeated until valid display data is provided to display interface 16. It is noted that during event G the fourth VPE 72 also receives additional video data (such as RGB graphics) from host bus 130. This additional video data is blended with video data from third VPE 68.

The events (A–M) occur during the following pixel clock cycles: event A during CK1–CK3; event B during CK4 till CK(2+N1), wherein N1 is the latency of the first VPE 60; event C during CK(3+N1) till CK(5+N1); event D during CK(6+N1)–CK(5+N1+N2), wherein N2 is the latency of the second VPE 64; event E during CK(6+N1+N2) till CK(8+N1+N2); event F during CK(9+N1+N2)–CK(9+N1+N2+N3), wherein N3 is the latency of the third VPE 68; event G during CK(9+N1+N2+N3) till CK(11+N1+N2+N3); event H during CK(12+N1+N2+N3) till CK(Z−1) whereas Z=(13+N1+N2+N3+N4) and whereas N4 is the latency of the fourth VPE 72; event I during CK(Z) till CK(Z+2); event J during CK(Z+3) till CK(2+Z+N5), wherein N5 is the latency of the fifth VPE 76; event K during CK(3+Z+N5) till CK(5+Z+N5); event L during CK(6+Z+N5)–CK(5+N5+N6), wherein N6 is the latency of the sixth VPE 80; and event M occurs during CK(6+N5+N6) till CK(8+N5+N6).

Figure 5:
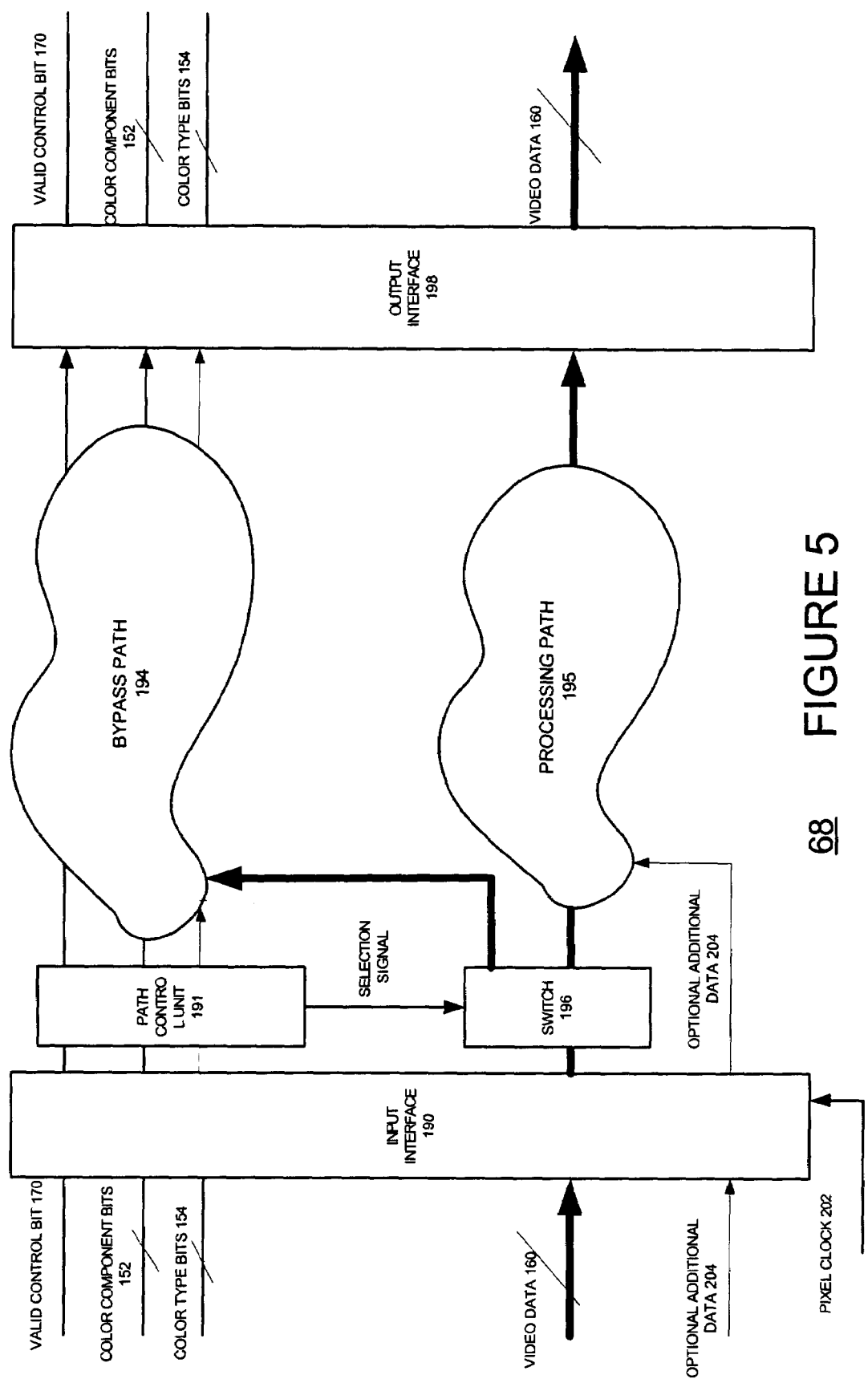
FIG. 5 is a schematic diagram of a VPE, in accordance with an embodiment of the invention.

FIG. 5 is a schematic diagram of the third VPE 68, in accordance with an embodiment of the invention. Third VPE 68 has an input interface 190 that receives input video data 160 and associated control signals (valid bit 170, color component bits 152 and color type bits 154) over bus 111. Bus 111 connects the second VPE 64 to the third VPE 68. The input interface 190 (or other input interfaces) can also receive additional data and/or additional video data (both denoted 204) from other sources such as look up table 122.

The input interface 190 strobes his input lines in response to an asserted valid control signal 170. At least one associated control signal is sent to a logic, such as path control unit 191, that is able to compare it to a mask such as to generate a selection signal. The selection signal is sent to switch 198 that in response sends the input video data to either a processing path such as path 195 or to a bypass path, such as bypass path 194. The bypass path 194 also receives all the control signals. If there is more than a single processing path the selection signal defines which processing path will receive the signal. It is noted that the processing path 195 performs color format conversion. The bypass path 194 and the processing path 195 are connected to an output interface 198 that in turn is connected over bus 111 to the fourth VPE 72. The third VPE 68 is characterized by a fixed latency (N3 pixel clock cycles), regardless of the selected path.

Figure 6:
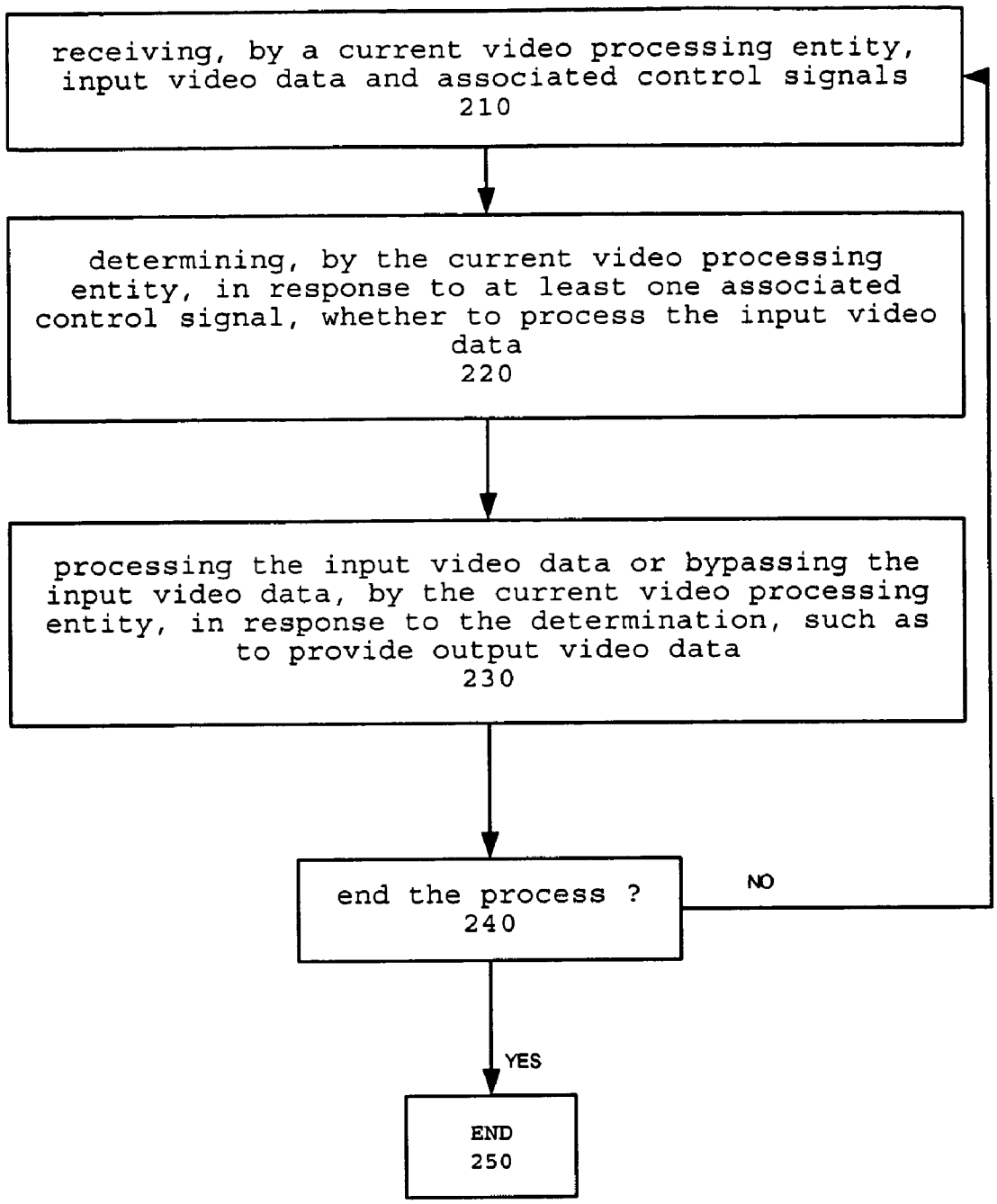
FIG. 6 is a flow chart illustrating a method for processing video data by a cascade of video processing entities, in accordance with an embodiment of the invention.

FIG. 6 is a flow chart illustrating a method 200 for processing video data by a cascade of video processing entities. Method 200 starts by step 210 of receiving, by a current video processing entity, input video data and associated control signals. Referring to FIG. 2 the current video processing entity can be either one of first till fifth VPE. It is assumed that the video processing entity is the second VPE 64 and that step 210 corresponds to event C of FIG. 3. It also assumed that the second VPE 64 receives picture type video data and that the second VPE 64 processes only the Y color component of the picture type video data.

Step 210 is followed by step 220 of determining, by the current video processing entity, in response to at least one associated control signal, whether to process the input video data. Referring to the mentioned above example, the second VPE 64 compares the color type bits 154 and color component bits 152 to a previously provided mask and determines to not to bypass a $C_b,C_r,Y$ pixel, although only the Y color component is altered. According to another embodiment of the invention the bypassing/processing decision can be made on a color component basis.

Step 220 is followed by step 230 of processing the input video data or bypassing the input video data, by the current video processing entity, in response to the determination, such as to provide output video data. Once the control signals and output video data are ready they can be retrieved by a next video processing entity. Referring to the mentioned above example, second VPE 64 does not provide the color components of a $C_b,C_r,Y$ to a bypass path although it may alter only the value of the Y color component in response to additional information from look up table 112. According to another embodiment of the invention the $C_b,C_r$ are provided to a bypass path. Once the processing and bypassing steps are completed the second VPE 64 asserts a valid bit 170, thus notifying the third VPE 68 that it may strobe its inputs.

Step 230 is followed by a query step 240 to determine whether to end the method 200 (for example when the signals are provided to display interface 16 or to a memory unit), or to repeat steps 210–230 until all the VPEs (or at least some predefined VPEs) perform video process processing. If end—jump to step 250. Referring to the mentioned above example the steps of 210–230 are repeated until the sixth VPE 80 is ready to provide display data to the display interface 16. It is further noted that the processing of pixels by the cascade of VPEs can continue until at least a predetermined portions of a display image is processed. The process may continue according to a predefined refresh rates as well in response to various decisions of the host processor 32.

Figure 7:
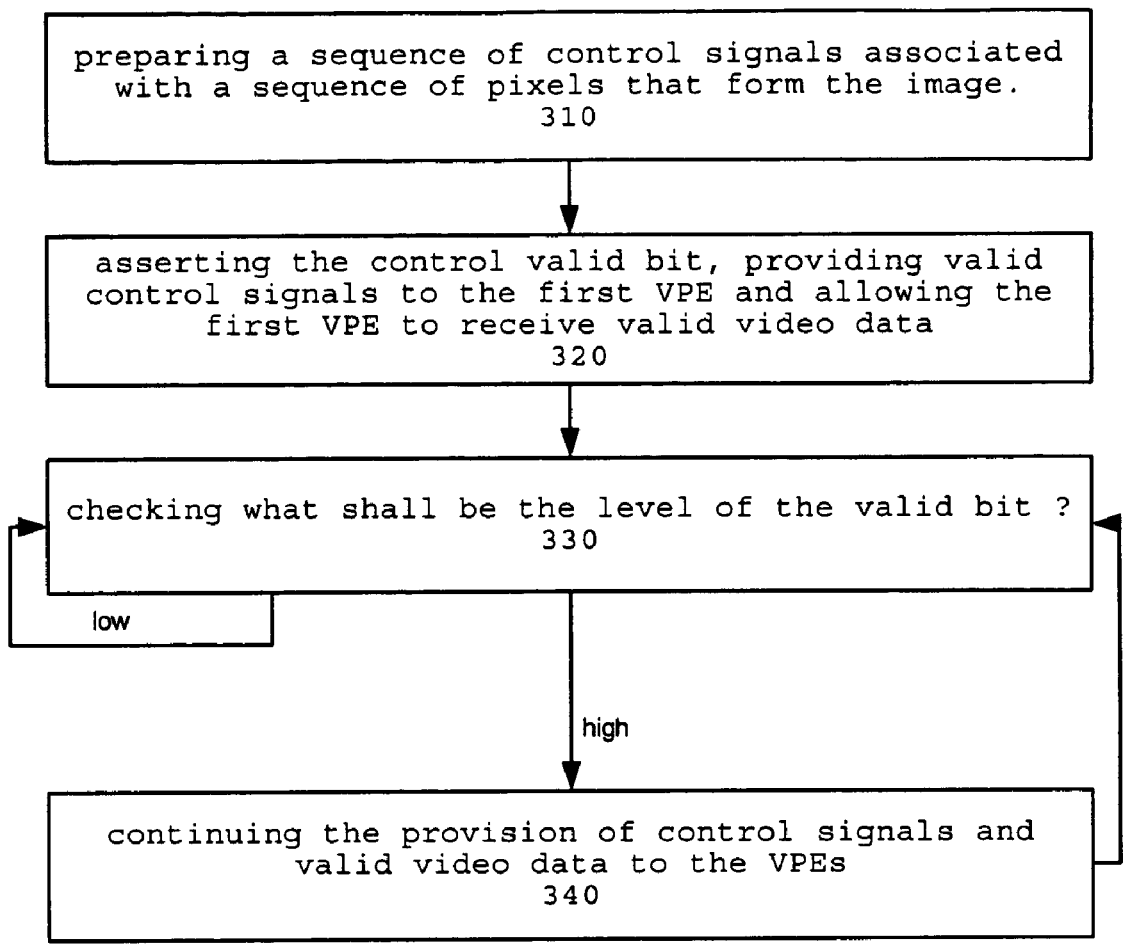
FIG. 7 illustrates a method for displaying an image on a display unit, in accordance with an embodiment of the invention.

FIG. 7 illustrates a method 300 for displaying an image on a display unit. Method 300 starts by step 310 of preparing a sequence of control signals associated with a sequence of pixels that form the image. The term image is used to define the visual content being displayed on the display unit. It may be include multiple pictures, graphics and the like. Each pixel can originate from a picture, from graphics, can belong to background area or not and can be formed as a combination of two video data types. The control signals reflect the video type of the pixel, as well as the color component. The control signals can be prepared by the pre-processing entity 90 and/or by another entity such as the host processor 32.

Step 310 is followed by step 320 of asserting the control valid bit and providing valid control signals to first VPE 60, as well as providing valid input video data to the first VPE 60.

Step 320 is followed by step 330 of checking what shall be the level of the valid bit 170. If the valid bit 170 has to be negated (or stay at a low level) step 330 is repeated until there is a need to assert the valid bit 170. The valid bit 170 can be negated if a VPE or other entity determines that the provision of valid video data and associated control signals must stop. The valid bit can be negated to prevent video data underflow or overflow, if there is no need to currently refresh the display unit, if additional data required for video processing is not available, and the like. If the valid bit has to be asserted (or remain at high level) then step 330 is followed by step 340 of continuing the provision of control signals and valid video data to the VPEs. Step 340 is followed by step 330.

Figure 8:
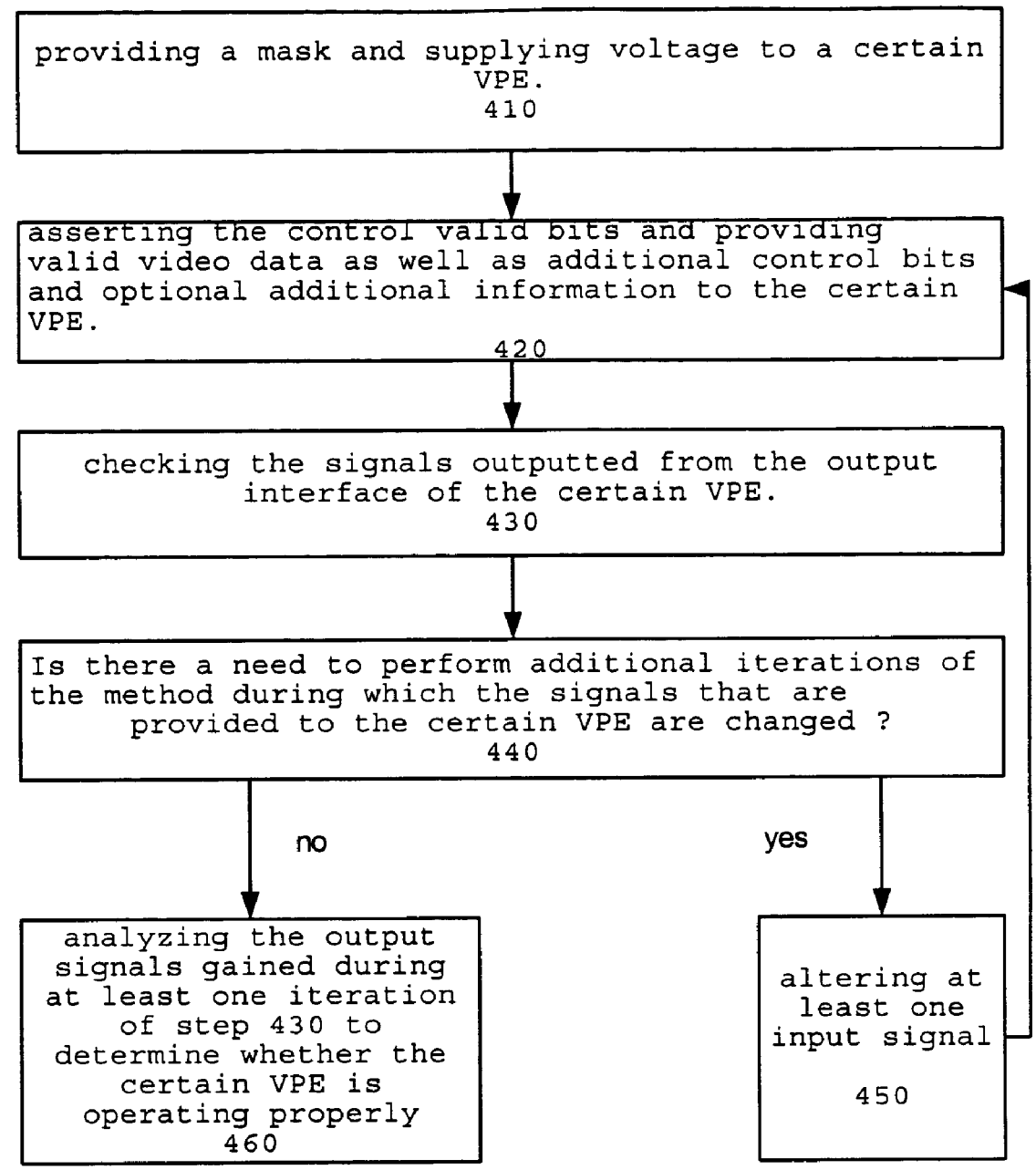
FIG. 8 illustrates a method for validation of a video processor entity, in accordance with an embodiment of the invention.

FIG. 8 illustrates a method 400 for validating a video processor entity. Method 400 starts by step 410 of providing a mask and supplying voltage to a certain VPE.

Step 410 is followed by step 420 of asserting the control valid bits and providing valid video data as well as additional control bits and optional additional information to the certain VPE.

Step 420 is followed by step 430 of checking the signals outputted from the output interface of the certain VPE.

Step 430 may be followed by step 440 of determining if there is a need to perform iterations of method 400 during which the signals that are provided to the certain VPE are changed. For example the type of video may be altered such that during a first check it should be processed while during another check it should be bypassed. If additional iterations are required step 440 is followed by step 450 of altering at least one input signal and jumping to step 430. Else, step 440 is followed by step 460 of analyzing the output signals gained during at least one iteration of step 430 to determine whether the certain VPE is operating properly. It is noted that method 400 can be used to check a high-level or low-level design of the VPE, using high level or low level simulations.

According to another embodiment of the invention control bits, such as valid bit 170 may be used to determine the state of a VPE. For example, as long as a VPE receives a negated valid bit signal it is not activated or remains in a "sleep mode", thus reducing the power consumption of the VPE and the apparatus. This feature is very useful in battery operated apparatuses.

It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

I claim:

1. A method for processing video signals by a cascade of video processing entities, the method comprising the steps of:

receiving, by a video processing entity of the cascade, input video data and associated control signals;

providing the input video data to a selected path out of at least one bypass path and at least one video processing path in response to at least one associated control signal, wherein each of the at least one processing path and the at least one bypass path have substantially the same latency;

outputting output video data from the selected path and outputting associated control signals; and repeating the steps of receiving, providing and outputting until a predefined entity receives the output video data.

2. The method of claim 1 further comprising providing, by another entity, additional data to the video processing entity.

3. The method of claim 1 wherein the associated control signals comprise a video type indication.

4. The method of claim 1 wherein the associated control signals comprise a color component indication.

5. The method of claim 1 wherein the step of providing involves comparing at least one control signal to a video processing entity mask.

6. The method of claim 1 wherein the associated control signals comprise a valid indication signal.

7. The method of claim 1 wherein each element of said input video data is associated with a pixel.

8. The method of claim 1 wherein said repeating is done until a predefined portion of an image is processed.

9. The method of claim 1 wherein each element of said input video data is associated with a pixel color component.

10. The method of claim 9 wherein said repeating is done until a predefined portion of an image is processed.

11. The method of claim 1 wherein said repeating is done until a predetermined amount of pixels are provided to a termination unit.

12. The method of claim 1 wherein the predefined entity is a display unit or a memory unit.

13. The method of claim 1 wherein at least one control signal is responsive to a state of at least one video processing entity.

14. The method of claim 1 wherein at least one control signal is responsive to a state of at least one other entity that is coupled to the cascade.

15. The method of claim 14 wherein the at least one other entity is a termination unit or a memory unit adapted to provide additional information to a video processing entity of the cascade.

16. The method of claim 1 wherein the video processing path includes at least one operation selected from the group consisting of: rotation; resizing, picture brightness control operation, picture contrast control operation, and picture saturation control operation.

17. The method of claim 1 wherein the video processing path includes at least one operation selected from the group consisting of: color format conversion, alpha blending, LCD display gamma adjustment and color space reduction.

18. The method of claim 1 wherein the predefined entity is a termination unit that is coupled to the cascade of video processing entities.

19. The method of claim 1 further comprising determining, by a video processing entity, a state of operation, in response to at least one associated control signal.

20. The method of claim 19 wherein one state of operation is a energy low consumption-state.

21. A cascade of at least two video processing entities, wherein each video processing entity comprises:
an input interface for receiving input video data and associated control signals;
logic, coupled to the input interface, for receiving at least one control signal and in response to select a selected path out of at least one processing path and at least one bypass path; wherein the selected path outputs output video data and
wherein each of the at least one processing path and the at least one bypass path have substantially the same latency; and
an output interface, coupled to the at least one processing path and to the at least one bypass path, for allowing a next cascaded entity to receive at least the output video data.

22. The cascade of claim 21 wherein the next cascaded entity is video processing entity or a termination unit.

23. The cascade of claim 21 wherein at least one video processing entity is adapted to receive additional data from another entity.

24. The cascade of claim 21 wherein the associated control signals comprise video type indication.

25. The cascade of claim 21 wherein the associated control signals comprise color component indication.

26. The cascade of claim 21 wherein the logic is adapted to compare at least one control signal to a video processing entity mask.

27. The cascade of claim 21 wherein the associated control signals comprise a valid indication signal.

28. The cascade of claim 21 wherein each input video data is associated with a pixel or a pixel color component.

29. The cascade of claim 21 wherein a first cascaded video processing entity is coupled to a pre-processing unit such as to receive from the pre-processing unit a sequence of associated control signals.

30. The cascade of claim 29 wherein each input video data is associated with a pixel or a pixel color component.

31. The cascade of claim 30 wherein the pre-processing unit halts or initializes a provision of associated control signals to the first cascaded video processing entity in response to a status of another entity that is coupled to the cascade.

32. The cascade of claim 29 wherein the pre-processing unit provides the sequence of associated control signals until the cascade processes a predefined portion of an image.

33. The cascade of claim 29 wherein the pre-processing unit halts or restarts a provision of associated control signals to the first cascaded video processing entity in response to a status of at least one video processing entity.

34. The cascade of claim 21 wherein video data can represent video data of at least one video type.

35. The cascade of claim 21 wherein the last cascaded video processing entity is coupled to a termination unit.

36. The cascade of claim 35 wherein the termination unit is a memory unit, a display unit or a display interface.

37. The cascade of claim 35 wherein the first video processing entity stops to receive associated control signals when a predefined amount of video data is provided to the termination unit.

38. The cascade of claim 21 wherein at least one associated control signal is responsive to a state of at least one video processing entity.

39. The cascade of claim 21 wherein at least one control signal is responsive to a state of at least one other entity that is coupled to the cascade.

40. The cascade of claim 39 wherein the at least one other entity is a termination unit or a memory unit adapted to provide additional information to a video processing entity of the cascade.

41. The cascade of claim 21 wherein at least one cascaded video processing entity is adapted to perform at least one of the following video processing processes: rotation; resizing, picture brightness control operation, picture contrast control operation, and picture saturation control operation.

42. The cascade of claim 21 wherein at least one cascaded video processing entity is adapted to perform at least one of the following video processing processes: color format conversion, alpha blending, LCD display gamma adjustment and color space reduction.

43. The cascade of claim 21 wherein at least one video processing entity is adapted to determine a state of operation in response to control bit values.

44. The cascade of claim 43 wherein one state of operation is a energy low consumption state.

45. A computer readable medium having code embodied therein for causing an electronic device to perform the steps of: receiving, by a video processing entity of a cascade of video processing entities, input video data and associated control signals; providing the input video data to a selected path out of at least one bypass path and at least one video processing path in response to at least one associated control signal, wherein each of the at least one processing path and the at least one bypass path have substantially the same latency; outputting output video data from the selected path and outputting associated control signals; and repeating the steps of receiving, providing and outputting until a predefined entity receives the output video data.

46. The computer readable medium of claim 45, wherein said steps further include:

determining, by a video processing entity, a state of operation, in response to at least one associated control signal.

47. The computer readable medium of claim 46, wherein one state of operation is a energy low consumption state.

* * * * *